United States Patent [19]

Wortman et al.

[11] Patent Number: 4,545,056
[45] Date of Patent: Oct. 1, 1985

[54] DEPRESSED COLLECTOR/RIBBON ELECTRON BEAM ANALYZER FOR A DIFFRACTION RADIATION GENERATOR

[75] Inventors: Donald E. Wortman, Rockville; Clyde A. Morrison, Wheaton; Richard P. Leavitt, Berwyn Heights, all of Md.

[73] Assignee: The United States of America as represented by the Secretary of the Army, Washington, D.C.

[21] Appl. No.: 622,324

[22] Filed: Jun. 19, 1984

[51] Int. Cl.⁴ .............................................. H01S 3/00
[52] U.S. Cl. ......................................... 372/2; 315/3; 315/3.5; 315/4; 315/5; 315/5.24; 315/5.38; 315/39.3
[58] Field of Search .................... 378/2; 315/3, 3.5, 4, 315/5, 5.24, 5.38, 39.3

[56] References Cited

U.S. PATENT DOCUMENTS

| | | | |
|---|---|---|---|
| 2,634,372 | 4/1953 | Salisbury | 315/4 |
| 3,170,116 | 2/1965 | Farrington | 324/70 |
| 3,271,618 | 9/1966 | Kooyers | 315/39.3 |
| 3,273,006 | 9/1966 | Osepchuk | 315/3.5 |
| 3,340,416 | 9/1967 | Young | 315/5.24 |
| 3,437,915 | 4/1969 | Russell | 324/24 |

OTHER PUBLICATIONS

Leavitt et al., "Millimeter-Wave Orotron Oscillation-Part 1: Theory", IEEE Jour. Quant. Elect., vol. QE-17, No. 8, Aug. 1981.
Wortman et al., "Millimeter-Wave Orotron Oscillation-Part II: Experiment", IEEE Jour. Quant. Elect., vol. QE-17, No. 8, Aug. 1981.

Primary Examiner—William L. Sikes
Assistant Examiner—Léon Scott, Jr.
Attorney, Agent, or Firm—Saul Elbaum; Tom McDonald; Anthony T. Lane

[57] ABSTRACT

A diffraction radiation generator in which a ribbon electron beam is directed over a diffraction grating within an open resonator at a selected velocity to generate coherent radiation. After passing through the open resonator, the ribbon beam is directed through aligned slits in two or more conductive elements to a collector. Progressively negative voltages relative to the grating voltage can be applied to the elements and the collector to decelerate the electrons forming the ribbon beam and thus minimize heating of the collector and increase the operating efficiency of the generator. Also, the elements and the collector can be utilized to analyze the ribbon beam.

20 Claims, 7 Drawing Figures

DEPRESSED COLLECTOR/RIBBON ELECTRON BEAM ANALYZER FOR A DIFFRACTION RADIATION GENERATOR

RIGHTS OF THE GOVERNMENT

The invention described herein may be manufactured, used, and licensed by or for the United States Government for governmental purposes without payment to us of any royalty thereon.

BACKGROUND OF THE INVENTION

The invention relates generally to a method and apparatus for generating coherent near millimeter wavelength radiation. More particularly, the invention relates to a diffraction radiation generator having a depressed collector, in which elements used to decelerate the electrons in the ribbon electron bean can also be used to analyze the ribbon beam.

In a diffraction radiation generator, such as an orotron, a ribbon electron beam is generated by applying a voltage between the cathode and anode of an electron gun. Generally, the anode is grounded and a negative voltage is applied to the cathode. The ribbon electron beam is directed across a slow wave structure within an open resonator to a collector disposed on the opposite side of the open resonator from the electron gun. In an orotron, the open resonator is formed by two mirrors and the slow wave structure is a reflecting diffraction grating embedded in one of the mirrors. If the proper conditions of synchronism between the electron velocity and the phase velocity of an evanescent wave traveling along the diffraction grating are met, coherent radiation results. The electron velocity is controlled by the potential difference between the cathode and the diffraction grating; the latter is generally near anode or ground potential.

In the past, the collectors of diffraction radiations generators have been maintained at or very close to the anode potential. Thus, the velocity of the electrons forming the ribbon beam remains essentially unchanged after these electrons pass through the open resonator, and all of the kinetic energy of these electrons is converted to heat when these electrons strike the collector. It would be highly desirable if these electrons could be decelerated before striking the collector, thus recovering most of their kinetic energy and improving the efficiency of the diffraction radiation generator.

OBJECTS AND SUMMARY OF THE INVENTION

It is an object of the invention to provide a method of increasing the efficiency of a diffraction radiation generator by decreasing the velocity of electrons forming the ribbon electron beam used to power the diffraction radiation generator before these electrons are received at an electron collector.

It is another object of the invention to provide a diffraction radiation generator that includes electron decelerating elements for decelerating the ribbon electron beam of the generator before this ribbon beam is received at the collector.

It is a further object of the invention to provide a method and apparatus for utilizing the electron deceleration elements of such a diffraction radiation generator to analyze the ribbon electron beam in situ.

The diffraction radiation generator, according to the invention, is similar to known diffraction generators in that it includes an open resonator containing a diffraction grating, an electron gun including an anode and a cathode for generating a ribbon electron beam when a potential difference is applied between them, a collector, and a magnetic field for guiding the ribbon electron beam generated by the electron gun across the diffraction grating to the collector. In addition, the diffraction radiation generator described herein includes two or more spaced-apart conductive elements disposed between the open resonator and the collector, each element including a slit disposed in the path of the ribbon electron beam to accommodate the ribbon beam directed therethrough by the magnetic field. These elements can either be used in conjunction with a depressed collector to decelerate the electrons forming the ribbon beam before these electrons strike the collector, or alternatively, these elements and the collector can be used to analyze the ribbon electron beam.

When used with a depressed collector maintained at a potential close to and above the cathode potential, the first element adjacent the open resonator is maintained at a potential above the collector potential but less than the diffraction grating potential. Each succeeding element is maintained at a potential above the collector potential but less than the potential of the adjacent element immediately preceding it. The electric field created by the difference in potential between the diffraction grating and the first element acts to decelerate the electrons forming the ribbon beam passing through this field. Similarly, each electric field created by the potential difference between adjacent elements acts to further decelerate the electrons forming the ribbon beam passing therethrough. Also, the electric field created by the potential difference between the last element and the collector acts to still further decelerate the electrons forming the ribbon beam passing therethrough. By so decelerating the electrons forming the ribbon beam, the kinetic energy of these electrons which must be converted into heat when these electrons strike the collector is minimized, increasing the efficiency of the diffraction radiation generator.

In the second application, both the collector and the first element are maintained at approximately anode or ground potential. The collector is connected to ground through current measurement devices for measuring the direct and alternating components of the collector current, and the first element is connected to ground through another current measurement device. The second element is connected to the negative output of a variable direct voltage supply having a grounded positive output. Also an a.c. generator is connected in series with the variable direct voltage supply (through a transformer) to superimpose a small alternating voltage on the negative direct voltage supplied to the second element from the variable direct voltage supply. The remaining elements of any, are maintained at the potential of the collector.

The output voltage of the variable direct voltage supply is varied in predetermined steps or increments from zero to a negative direct voltage at which the collector current entirely ceases. At each step, the direct and alternating components of the collector current are measured. The measured direct component of the collector current can be plotted against the negative direct voltage output of the variable direct voltage supply to obtain a cumulative energy distribution curve in which each measured direct component of the collector current is a measure of the number of electrons in the ribbon beam having a velocity which equals or exceeds a velocity corresponding to the negative direct voltage output of the variable direct voltage supply at that step. The measured alternating component of the collector current can be plotted against the negative direct voltage output of the variable direct voltage supply to obtain a normal energy distribution curve in which each measured alternating component of the collector current is a measure of the number of electrons in the ribbon beam having a velocity corresponding to the negative direct voltage output of the variable direct voltage supply at that step.

Also, an indication of beam "sharpness" can be obtained by raising or lowering the electron beam in predetermined increments, and measuring the first element current at each step.

BRIEF DESCRIPTION OF THE DRAWINGS

The invention will be better understood, and further objects, features and advantages thereof will become more apparent from the following description of the preferred embodiments, taken in conjunction with the accompanying drawings in which.

DESCRIPTION OF PREFERRED EMBODIMENTS

Figure 1:
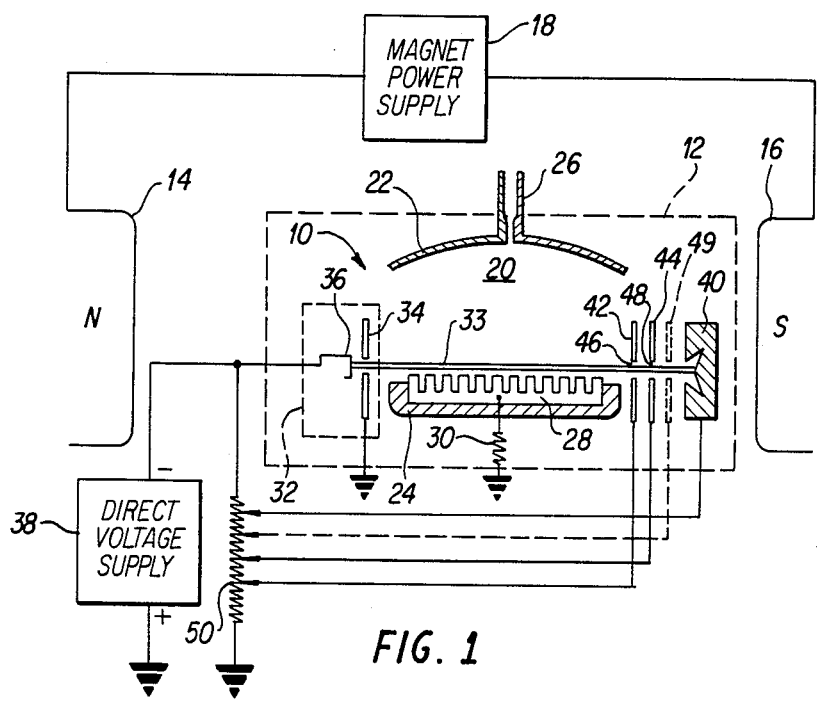
FIG. 1 is a schematic diagram of a preferred embodiment of the invention, utilizing a depressed collector.

Referring to FIG. 1, an orotron 10 is disposed within a vacuum chamber 12 between north and south poles 14, 16 of a magnetic power supply 18. The orotron 10 includes an open resonator 20 formed by two spaced-apart mirrors 22, 24. The upper mirror 22 includes a centrally located waveguide output coupling 26 for receiving coherent radiation generated within the open resonator 20. The lower mirror 24 includes a metallic reflecting diffraction grating 28 electrically insulated from the rest of the structure and embedded therein which is connected to ground through a resistor 30.

The orotron 10 includes an electron gun 32 disposed of one side of the open resonator 20 for generating a ribbon electron beam 33. The electron gun 32 includes a grounded anode 34 which has a horizontal slit therethrough to accommodate the ribbon beam 33, and a cathode 36 which is connected to the negative terminal of a direct voltage supply 38 having a grounded positive output.

A collector 40 is disposed on an opposite side of the open resonator 20. Two spaced-apart conductive elements 42, 44, are disposed between the open resonator 20 and the collector 40. These conductive elements 42, 44 include respective horizontal slits 46, 48 extending therethrough. These slits 46,48 are sized to accommodate the ribbon electron beam 33 generated by the electron gun 32, and are disposed in the path of the ribbon electron beam 33 between the electron gun 32 and the collector 40.

Figure 2:
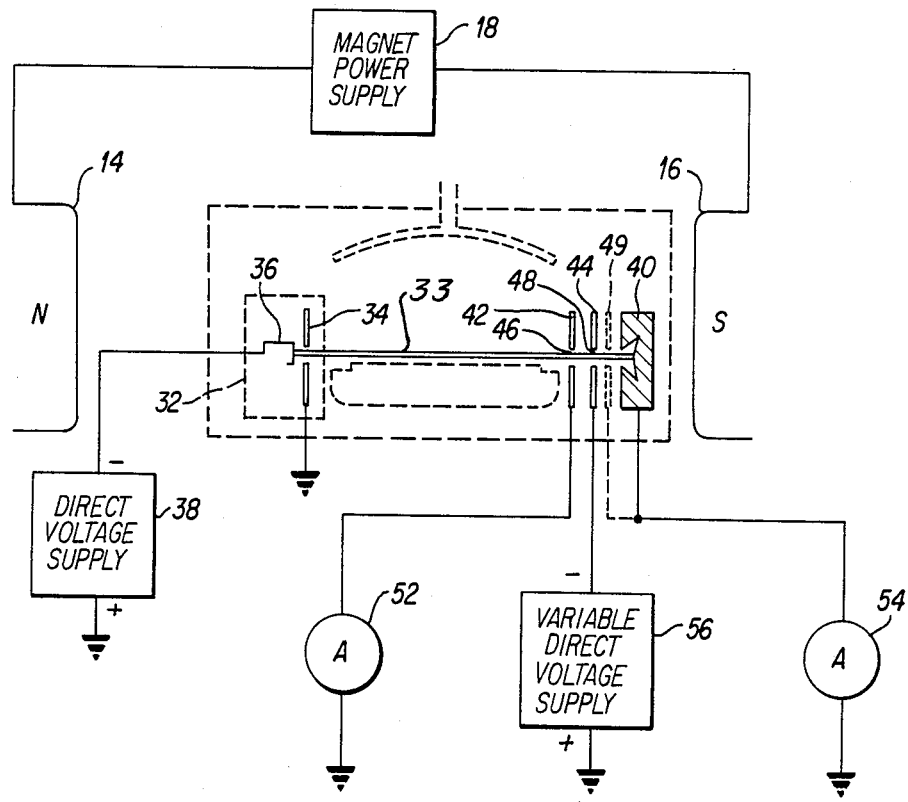
FIG. 2 is a schematic diagram of an embodiment of the invention for analyzing the ribbon electron beam for powering a diffraction radiation generator.
Figure 5:
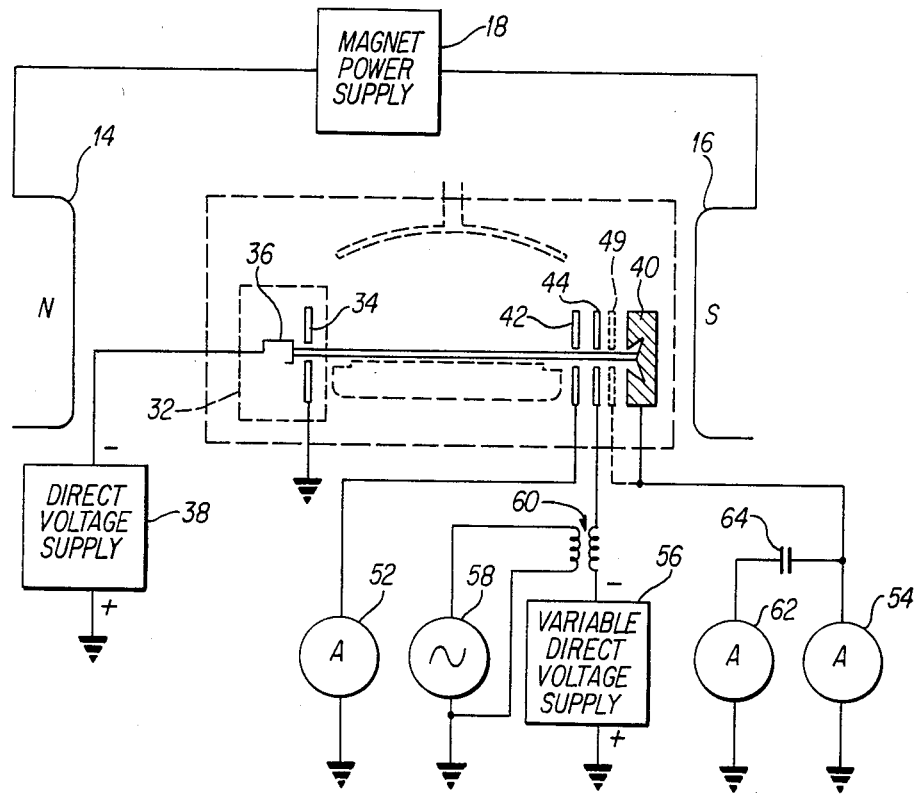
FIG. 5 is a schematic diagram of another embodiment of the invention for analyzing the ribbon electron beam of a diffraction radiation generator.

Additional elements similar to the first and second elements 42, 44, such as a third element 49 shown by dashed lines in FIGS. 1, 2, and 5, may also be disposed in the path of the ribbon electron beam 33 intermediate the second element 44 and the collector 40. The embodiment of the invention having only two elements 42, 44 is described below.

The collector 40, the first element 42, and the second element 44 are connected to receive negative voltages from a voltage divider 50 connected across the direct voltage supply 38. The direct voltage supply to the first element 42 is less than the voltage of the diffraction grating 28, the voltage supplied to the second element 44 is less than that supplied to the first element 42, and the voltage supplied to the collector 40 is less than that supplied to the second element 44 but greater than that supplied to the cathode 36 of the electron gun 32. Stated another way, the voltage of the first element 42 is negative relative to the voltage of the diffraction grating 28, the voltage of the seconds element 44 is negative relative to the voltage of the first element 42, the voltage of the collector is negative relative to the voltage of the second element 44, and the voltage of the cathode 36 is negative relative to the voltage of the collector 40.

During operation of the orotron 10, the ribbon electron beam 33 generated by the electron gun 32 is guided by the magnetic field extending between the north and south pole pieces 14, 16 across the diffraction grating 28 and through the slits 46, 48 to the collector 40. As the ribbon electron beam 33 passes over the surface of the diffraction grating 28, it radiates in a mode of the open resonator 20. The radiation from the open resonator 20 is then fed back onto the ribbon beam 33, causing the electrons therein to bunch together. When the proper conditions of synchronism are met between the electron velocity and the phase velocity of a slow wave propagating along the grating surface, the orotron 10 will radiate coherently at a frequency near one of the resonant frequencies of the open resonator 20. The velocity of the ribbon beam 33 as it passes through the open resonator 20 is determined by the voltage difference between the cathod 36 and the diffraction grating 28. Generally, the diffraction grating voltage is close to the anode voltage.

After the ribbon electron beam 33 has passed through the open resonator 20, it is progressively decelerated. The potential difference between the diffraction grating 28 and the first element 42 creates a first electric field which acts to decelerate the electrons in the ribbon beam 33 in the region between the diffraction grating 28 and the first element 42. Similarly, the potential difference between the first element 42 and the second element 44 creates a second electric field which acts to decelerate the electrons in the ribbon beam 33 in the region between these two elements 42, 44. Finally, the potential difference between the second element 44 and the collector 40 creates a third electric field which acts to decelerate the electrons in the ribbon beam 33 in the region between the second element 44 and the collector 40.

The two elements 42, 44 and the collector 40 can also be used to analyze the ribbon electron beam 33 of the orotron 10, as illustrated in FIG. 2. In the ribbon beam analyzing circuits shown in FIG. 2, the first element 42 and the collector 40 are connected to ground through respective DC ammeters 52, 54. The second element 44 is connected to the negative terminal of a variable direct voltage supply 56, which has a positive terminal connected to ground. In FIG. 2, the open resonator 20 is shown in dotted lines, since this open resonator is not required in order for an analysis of the ribbon beam 34 to be performed.

The ribbon electron beam 33 is generated when a negative voltage is applied to the cathode 36, and is guided through the slits 46, 48 of the first and second elements 42, 44 to the collector 40 by the magnetic field generated by the magnetic power supply 18. To analyze this ribbon electron beam 33, the negative direct voltage $-V_e$ supplied from the variable direct voltage supply 56 to the second element 44 is varied in steps from zero to a negative direct voltage $-V_{max}$ (slightly more negative than the cathode voltage) at which the collector current $i_{co}$ ceases. At each step, the collector current $i_{co}$ is also measured by the DC ammeter 54, to thus obtain data for a plot of the collector current $i_{co}$ versus the second element voltage, $-V_e$. Alternatively, the second element voltage $-V_e$ can be swept at a constant rate from zero to $-V_{max}$ and the collector current $i_{co}$ can be continuously measured over this sweep time to obtain a continuous plot of the collector current $i_{co}$ versus the second element voltage $-V_e$.

Figure 3:
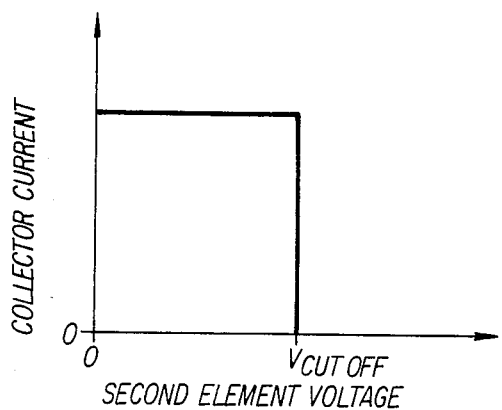
FIGS. 3 and 4 are graphs of the collector current versus the second element voltage in the embodiment of FIG. 2, for the ideal case and a typical case, respectively.

Ideally, all electrons of the ribbon beam 33 would have the same velocity v, in which $$v = \sqrt{\frac{2qV}{m}}$$

where q is the electron charge, m is the electron mass, and V is the accelerating voltage. In such an ideal case, a plot of the collector current $i_{co}$ versus the second element voltage $-V_e$ would appear as shown in FIG. 3. As the direct negative voltage $-V_e$ supplied to the second element 44 is increased from zero, the collector current $i_{co}$ would remain constant until the second element voltage $-V_e$ equals the direct negative voltage $-V_{cutoff}$ corresponding to the electron velocity v, at which point the collector current $i_{co}$ would abruptly drop to zero.

In fact, however, all ribbon electron beams have a velocity spread. Thus, in a typical case illustrated in FIG. 4, as the negative direct voltage $-V_e$ supplied to the second element 44 increases, the collector current $i_{co}$ will remain constant until the second element voltage $-V_e$ equals a direct negative voltage $-V_{min}$ corresponding to the minimum electron velocity of the ribbon beam 33. Thereafter, as the negative second element voltage $-V_e$ is further increased, the collector direct current $i_{co}$ decreases. When the second element voltage $-V_e$ is equal to a negative direct voltage $-V_{max}$ corresponding to the maximum electron velocity of the ribbon beam 33, the collector current $i_{co}$ ceases. For example, in a test conducted on an orotron developed at Harry Diamond Laboratories, Adelphi, Md., in which the diffraction grating 28 was removed, the orotron was disposed in a 1.5 KG magnetic field, and a negative direct voltage of $-550$ volts was applied to the cathode 36 of the electron gun 32 to generate the ribbon beam 33, the collector current $i_{co}$ remained constant until the negative direct voltage $-V_e$ supplied to the second element 44 was increased to approximately $-535$ volts. Thereafter, the collector current $i_{co}$ decreased until a second element voltage $-V_e$ of approximately $-560$ volts, the collector current $i_{co}$ completely ceased. Thus, at each step during this measurement process, the measured collector current $i_{co}$ is an indication of the number of electrons in the ribbon beam 33 having a velocity greater than that corresponding to the second element voltage $-V_e$ at that step.

The total current $i_{co}$ measured at the collector 40 includes all electrons with a velocity equal to or greater than $v_{min}$, which is equal to $$v_{min} = \sqrt{\frac{2qV_e}{m}}$$

Thus, $$i_{co} = q \int_{v_{min}}^{\infty} v\, n(v)\, dv$$

where n(v) is the number of electrons per unit length of beam with velocity v. By differentiating with respect to $v_{min}$, we obtain $$\frac{di_{co}}{dv_{min}} = -qv_{min}n(v_{min})$$

Figure 4:
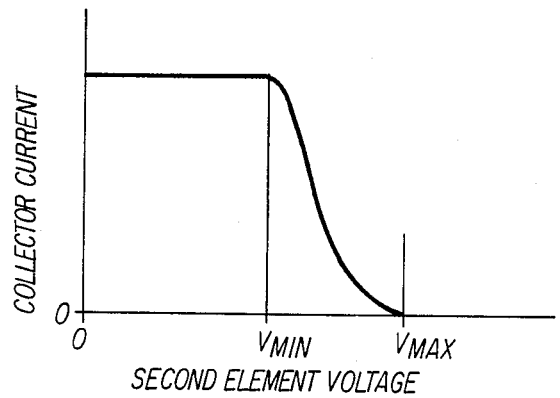

The slope of the curve shown in FIG. 4 can be measured at each measurement point to obtain the rate of change of the collector current $i_{co}$ with the second element voltage, $di_{co}/dV_e$. This number allows us to obtain the rate of change of the collector current $i_{co}$ with the rate of change of the electron velocity v, $di_{co}/dv$, which is equal to $$\frac{di_{co}}{dv} = \frac{dV_e}{dv} \cdot \frac{di_{co}}{dV_e}$$

From this, we obtain:

$$n(v) = \frac{-m}{q2} \cdot \frac{di_{co}}{dV_e}$$

Figure 6:
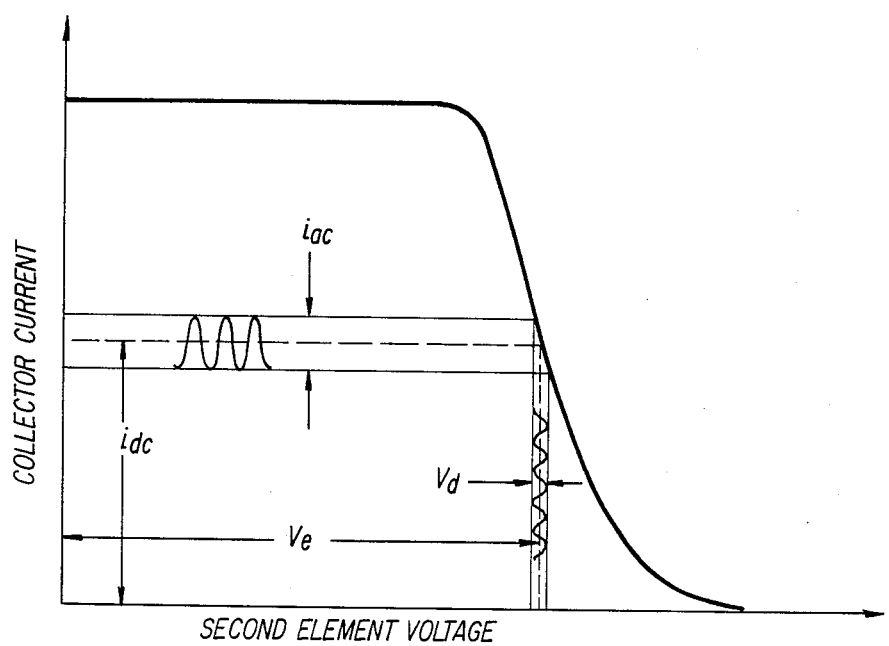
FIG. 6 is a graph of the collector current versus the second element voltage in the embodiment of FIG. 5.
Figure 7:
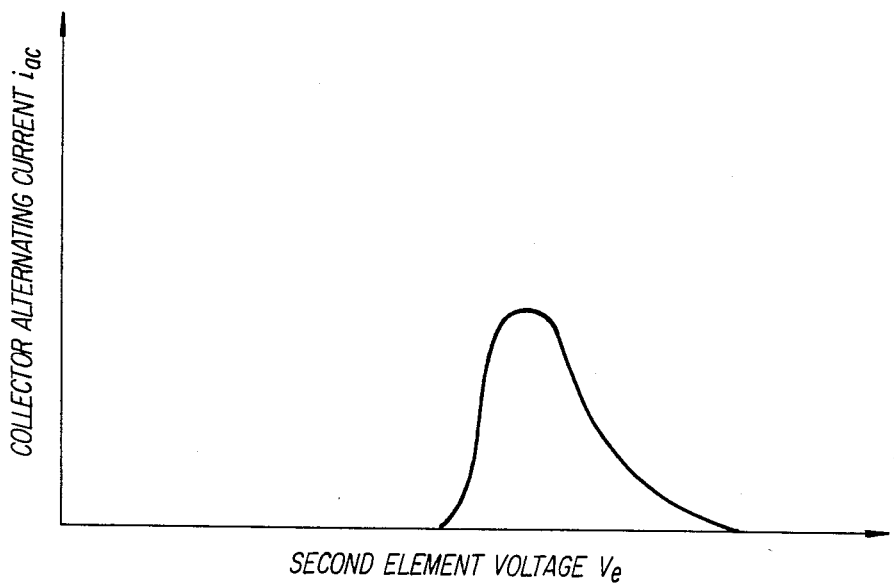
FIG. 7 is a graph of the alternating component of the collector current versus the negative direct voltage supplied to the second element.

The rate of change of the collector current $i_{co}$ with the second element voltage, $di_{co}/dV_e$, can be obtained directly by utilizing the circuit shown in FIG. 5. In this circuit, an AC generator 58 is connected in series with the variable direct voltage supply 56 through a transformer 60 to superimpose a small alternating voltage, or "dither" voltage $V_d$, on the negative direct voltage $-V_e$ supplied to the second element from the variable direct voltage supply 56. Also, an AC ammeter 62 is connected in parallel with the DC ammeter 54 through a capacitor 64 to measure the AC component $i_{ac}$ of the collector current $i_{co}$. As the direct negative voltage supplied by the variable direct voltage supply 56 to the second element 44 is varied in steps, at each step, the DC component $i_{dc}$ of the collector current $i_{co}$ is measured by the DC ammeter 54, and the AC component $i_{ac}$ of the collector current $i_{co}$ is measured by the AC ammeter 62. As shown in FIG. 6, the AC component $i_{ac}$ of the collector current $i_{co}$ will vary directly as the rate of change of the collector current $i_{co}$ with the negative direct voltage $-V_e$ supplied to the second element 44. Thus, when the alternating component $i_{ac}$ of the collector current $i_{co}$ is plotted against the negative direct voltage $-V_e$ supplied to the second element 44, each measured alternating component $i_{ac}$ of the collector current is an indication of the number of electrons in the ribbon beam 33 having a velocity corresponding to the selected direct negative voltage $-V_e$ applied to the second element 44.

Generally, orotrons include a precision positioning device, such as a worm gear train, for raising or lowering the electron gun 32, to thus adjust the position of the ribbon beam 33 relative to the diffraction grating 28. To determine the "sharpness" of the ribbon electron beam 33, the electron gun 32 can be raised or lowered in incremental steps so that the ribbon electron beam 33 will progressively impinge upon the first element 42, and the first element current can be measured by the ammeter 52.

In one variation of the invention, the third element 49 shown by dashed lines in FIGS. 1, 2, and 5 is disposed intermediate the second element 44 and the collector 40. Like the first and second elements 42, 44, the third element 49 includes a horizontal slit to accommodate the ribbon electron beam 33 directed therethrough.

During operation of the orotron 10, the third element 49 is connected to the voltage divider 50 to receive a negative voltage intermediate the second element voltage and the collector voltage, as shown in FIG. 1. As described above, the potential difference between the diffraction grating 28 and the first element 42 creates a first electric field which acts to decelerate the electrons in the ribbon beam 33 in the region between the diffraction grating 28 and the first element 42; similarly, the potential difference between the first element 42 and the second element 44 creates a second electric field which acts to decelerate the electrons in the ribbon beam 33 in the region between the first and second elements 42, 44. In this variation of the invention, the potential difference between the second element 44 and the third element 49 creates a third electric field which act to decelerate the electrons in the ribbon beam 33 in region between the second and third elements 44, 49. Finally, the potential difference between the third element 49 and the collector 40 creates a fourth electric field which acts to decelerate the electrons in the ribbon beam 33 in the region between the third element 49 and the collector 40.

When the elements 42, 44, 49, and the collector are used to analyze the ribbon electron beam 33, the third element 49 is connected to the collector 40, as shown in FIGS. 2 and 5.

The use of elements such as the third element 49 in addition to the first and second elements 43, 44, is advantageous in that more of the kinetic energy of the electrons forming the ribbon beam 33 is recovered, to thus further improve the efficiency of the orotron 10.

Since there are many modifications, variations, and additions to the specific embodiments of the invention described herein would be obvious to one skilled in the art, it is intended that the scope of the invention be limited only by the impending claims.

What is claimed and desired to be secured by Letters Patent of the United States is:

1. A diffraction radiation generator comprising:
   first voltage supply means for supplying a plurality of direct voltages;
   beam forming means for generating a ribbon electron beam, including a cathode and an anode which are connected to receive respective direct voltages from the first voltage supply means, the anode voltage being positive relative to the cathode voltage;
   beam directing means for directing the ribbon beam along a predetermined path; and
   a collector assembly comprising
      second voltage supply means for supplying a plurality of selected adjustable direct voltages not exceeding the anode voltage,
      a collector, which is spaced from the beam forming means and is disposed in the beam path, for receiving the ribbon beam, said collector being connected to receive a selected direct voltage from the second voltage supply means which is positive relative to the cathode voltage,
      at least two electrically conductive elements disposed between the beam forming means and the collector and having respective slits disposed in the beam path to accommodate the ribbon beam directed therethrough by the beam directing means, said at least two elements including a first element which is connected to receive a selected direct voltage from the second voltage supply means which is positive relative to the cathode voltage and a second element which is disposed between the first element and the collector and which is connected to receive a selected direct voltage from the second voltage supply means which is negative relative to the first element voltage, wherein the voltage difference between the first and second element creates an electric field which acts to decelerate the electrons forming the ribbon beam in the portion of the beam path between the first element and second element and thereby minimize heating of the collector and increase the operating efficiency of the generator.

2. A diffraction radiation generator, as described in claim 1, wherein the voltage supplied to the collector from the second voltage supply means is selected to be negative relative to the second element voltage, wherein the voltage difference between the second element and the collector creates an electric field which acts to decelerate the electrons forming the ribbon beam in the portion of the beam path between the second element and the collector.

3. A diffraction radiation generator, as described in claim 2, which further comprises an open resonator disposed between the beam forming means and the first element, said open resonator including a metallic diffraction grating extending parallel and in close proximity to the ribbon beam directed through the open resonator by the beam directing means, said diffraction grating being connected to receive a direct voltage from the first voltage supply means which is positive relative to the cathode voltage and is close to the anode voltage,
   wherein the first element voltage is selected to be negative relative to the grating voltage, the voltage difference between the diffraction grating and the first element creating an electric field which acts to decelerate the electrons forming the ribbon beam in the portion of the beam path between the diffraction grating and the first element.

4. A diffraction radiator generator, as described in claim 1, wherein:

the at least two elements comprises a third element disposed between the second element and the collector and connected to receive a selected direct voltage from the second voltage supply means which is positive relative to the cathode voltage and negative relative to the second element voltage, the voltage difference between the second and third elements creating an electric field which acts to decelerate the electrons forming the ribbon beam in the portion of the beam path between the second element and the third element; and the voltage supplied to the collector from the second voltage supply means is selected to be negative relative to the third element voltage, wherein the voltage difference between the third element and the collector creates an electric field which acts to decelerate the electrons forming the ribbon beam in the portion of the beam path between the third element and the collector.

5. A diffraction radiation generator, as described in claim 4, which further comprises an open resonator disposed between the beam forming means and the first element, said open resonator including a metallic diffraction grating extending parallel and in close proximity to the ribbon beam directed through the open resonator by the beam directing means, said diffraction grating being connected to receive a direct voltage from the first voltage supply means which is positive relative to the cathode voltage and is close to the anode voltage, wherein the first element voltage is selected to be negative relative to the grating voltage, the voltage difference between the diffraction grating and the first element creating an electric field which acts to decelerate the electrons forming the ribbon beam in the portion of the beam path between the diffraction grating and the first element.

6. A diffraction radiation generator, as described in claim 1, wherein:

the collector assembly further comprises current measuring means for measuring the collector current; and the voltages supplied by the second voltage supply means are selected such that the collector and the first element are maintained at approximately anode voltage, a series of selected voltages are sequentially supplied to the second element over a voltage range extending from a voltage above the cathode voltage which does not change the collector current to a voltage below the cathode voltage at which the collector current is zero, and any remaining elements are maintained at approximately anode voltage;

wherein the collector assembly serves as a ribbon electron beam analyzer, whereby the collector current measured by the current measuring means at each selected second element voltage is an indication of the number of electrons in the ribbon beam having a velocity greater than that corresponding to the selected second element voltage.

7. A diffraction radiation generator, as described in claim 6, wherein:

the collector assembly further comprises an alternating voltage supply means for superimposing a small alternating voltage on the selected direct voltage supplied to the second element; and said current measuring means comprises an alternating current measuring device for measuring an alternating component of the collector current.

8. A diffraction radiation generator, as described in claim 1, which further comprises:

positioning means for adjusting the relative positions of the ribbon beam and the first element; and current measuring means for measuring the second element current.

9. A diffraction radiation generator, as described in claim 8, wherein said positioning means is a translation means for adjusting the position of the beam forming means orthogonal to the direction of the ribbon beam.

10. A diffraction radiation generator comprising:

an open resonator including a diffraction grating extending between opposite ends of the open resonator;

beam forming means for generating a ribbon electron beam, which is disposed adjacent one end of the open resonator and which includes a cathode and an anode;

a collector, spaced from an opposite end of the open resonator, for receiving the ribbon beam;

at least two conductive elements disposed between the open resonator and the collector and having respective slits therethrough to accommodate the ribbon beam, the at least two elements including a first element adjacent the open resonator and a last element adjacent the collector;

beam directing means for directing the ribbon beam generated by the beam forming means across the diffraction grating and through the slits of the at least two elements to the collector; and voltage supply means for supplying direct voltages to the cahode, the anode, the at least two elements, and the collector, respectively, wherein the cathode voltage is the lowest or most negative voltage, the first element voltage is lower than the diffraction grating voltage, the voltage of each remaining element is lower than the voltage of the adjacent preceding element, and the collector voltage is lower than the last element voltage such that heating of the collector is minimized and the operating efficiency of the generator is increased.

11. A diffraction radiation generator, as described in claim 10, which further comprises means for determining the sharpness of the ribbon beam, including:

positioning means for adjusting the relative positions of the ribbon beam and the first element; and current measuring means for measuring the second element current.

12. A diffraction radiation generator comprising:

an open resonator;

a metallic diffraction grating disposed within the open resonator;

beam forming means for generating a ribbon electron beam, which is disposed on one side of the open resonator and which includes a cathode and an anode;

first voltage supply means for supplying direct voltages to the cathode, the anode, and the diffraction grating, respectively, wherein the anode voltage and the grating voltage are positive relative to the cathode voltage;

beam directing means for directing the ribbon beam along a path extending through the open resonator across the diffraction grating; and a depressed collector/beam analyzer assembly which comprises
  a collector for receiving the ribbon beam, which is disposed in the beam path on an opposite side of the open resonator,
  at least two electrically conductive elements disposed between the open resonator and the collector and having respective slits disposed in the beam path to accommodate the ribbon beam directed therethrough by the beam directing means, said at least two elements including a first element adjacent the open resonator and a last element adjacent the collector,
  second voltage supply means for supplying selected adjustable direct voltages to the collector and the at least two elements, respectively, and
  current measuring means for measuring the collector current;
  wherein said assembly serves as a depressed collector when the voltages supplied by the second voltage supply are selected such that the first element voltage is negative relative to the grating voltage, the voltage of each remaining element is negative relative to the voltage of the adjacent preceding element, and the collector is negative relative to the voltage of the last element and is positive relative to the cathode voltage; and
  wherein said assembly serves as a ribbon electron beam analyzer when the voltages supplied by the second voltage supply means are selected such that the collector and the first element are maintained at approximately anode voltage, a series of selected voltages are sequentially supplied to the second element over a voltage range extending from a voltage above the cathode voltage which does not change the collector current to a voltage below the cathode voltage at which the collector current is zero, and any remaining elements are maintained at approximately anode voltage, the measured collector current at each selected second element voltage indicating the number of electrons in the ribbon beam having a velocity greater than the velocity corresponding to the selected second element voltage.

13. A diffraction radiation generator, as described in claim 12, wherein:
  said depressed collector/beam analyzer assembly further comprises an alternating voltage supply means for superimposing a small alternating voltage on the selected direct voltages supplied to the second element when the assembly is utilized as a ribbon electron beam analyzer; and
  said current measuring means comprises an alternating current measuring device for measuring an alternating component of the collector current.

14. A diffraction radiation generator, as described in claim 12, which further comprises:
  positioning means for adjusting the relative positions of the ribbon beam and the first element; and
  current measuring means for measuring the second element current.

15. A method of generating coherent radiation, comprising the simultaneous steps of:
  applying direct voltages to a cathode and an anode of an electron gun to generate a ribbon electron beam, the anode voltage being greater, i.e., more positive, than the cathode voltage;
  directing the ribbon beam along a path extending over a metallic diffraction grating within an open resonator and through aligned slits in at least two electrically conductive elements to a collector, the at least two elements including a first element adjacent the open resonator and a last element adjacent the collector;
  applying a direct voltage to the diffraction grating which is greater than the cathode voltage so as to cause the generation of coherent radiation within the open resonator;
  applying a direct voltage to the first element which is less than the diffraction grating voltage to create an electric field along the beam path between the diffraction grating and the first element causing deceleration of the electrons forming the ribbon beam;
  applying a direct voltage to each remaining element which is less than the voltage applied to the adjacent preceding element to create an electric field along the beam path between each remaining element and the adjacent preceding element causing further deceleration of the electrons forming the ribbon beam; and
  applying a direct voltage to the collector which is greater than the cathode voltage and less than the last element voltage to create an electric field along the beam path between the last element and the collector causing final deceleration of the electrons forming the ribbon beam such that heating of the collector is minimized and the operating efficiency of the generator is increased.

16. A method of analyzing a ribbon electron beam of a diffraction radiation generator which is generated by applying direct voltages to the cathode and anode of an electron gun, the anode voltage being positive relative to the cathode voltage, and which is directed along a beam path extending through respective slits in spaced-apart first and second elements to a collector, said method comprising the steps of:
  applying direct voltages to the first element and the collector which are approximately equal to the anode voltage;
  sequentially applying selected direct voltages to the second element over a voltage range extending above and below the cathode voltage, and measuring the collector current at each selected second element voltage, the sequence of selected second element voltages extending from a high voltage which does not change the collector current to a low voltage at which the collector current is zero, whereby each measured collector current is an indication of the number of electrons in the ribbon beam having a velocity greater than that corresponding to the selected second element voltage.

17. A method, as described in claim 16, which further comprises the steps of:
  superimposing a small alternating voltage, or dither voltage, on the selected direct voltage applied to the second element; and
  measuring the alternating component of the collector current at each selected direct voltage applied to the second element;
  whereby each measured alternating component of the collector current is an indication of the number of electrons in the ribbon beam having a velocity corresponding to the selected direct voltage applied to the second element.

18. A method, as described in claim 16, which further comprises the steps of:

adjusting the relative position of the ribbon electron beam and the first element in selected increments, so that one side of the first element slit progressively extends into the path of the ribbon beam; and measuring the first element current at each selected increment, whereby the measured first element currents provide an indication of the sharpness of the ribbon beam.

19. A method, as described in claim 18, wherein the step of adjusting the relative positions of the ribbon electron beam and the first element comprises the steps of translating the electron gun orthogonal to the direction of the ribbon beam.

20. A method, as described in claim 16, wherein the beam path extends from the electron gun across a diffraction grating within an open resonator, then through the respective slits in the first and second elements to the collector.

* * * * *